United States Patent [19]

Harnett

[11] 4,088,381
[45] May 9, 1978

[54] INTERCONNECTOR

[75] Inventor: Herbert Martin Harnett, Whitstable, England

[73] Assignee: Bunker Ramo Corporation, Oak Brook, Ill.

[21] Appl. No.: 739,912

[22] Filed: Nov. 8, 1976

[30] Foreign Application Priority Data

Nov. 19, 1975 United Kingdom ............... 47667/75

[51] Int. Cl.² .......................... H01R 3/04; H02B 1/02
[52] U.S. Cl. ................................ 339/94 A; 339/117 P
[58] Field of Search .......... 339/94 A, 126 RS, 117 R, 339/117 P, 218 R, 218 M

[56] References Cited

U.S. PATENT DOCUMENTS 3,998,515  12/1976  Panek ................................. 339/94 A Primary Examiner—Neil Abrams
Attorney, Agent, or Firm—William Lohff; F. M. Arbuckle

[57] ABSTRACT

An interconnector for installation in an opening in a wall to provide at least one electrical connection through said wall, and a method for making same. The interconnector comprises a one piece tubular metal shell, at least one conductor within said shell, and two spaced apart glass sealing members supporting said conductors within said shell. The shell includes at least one port allowing access to the space interior of said shell and between said sealing members. The method for making the interconnector includes the steps of supporting one of the sealing members with a layer of inert flowable material, and subsequently removing the material through the port.

7 Claims, 4 Drawing Figures

U.S. Patent     May 9, 1978     4,088,381
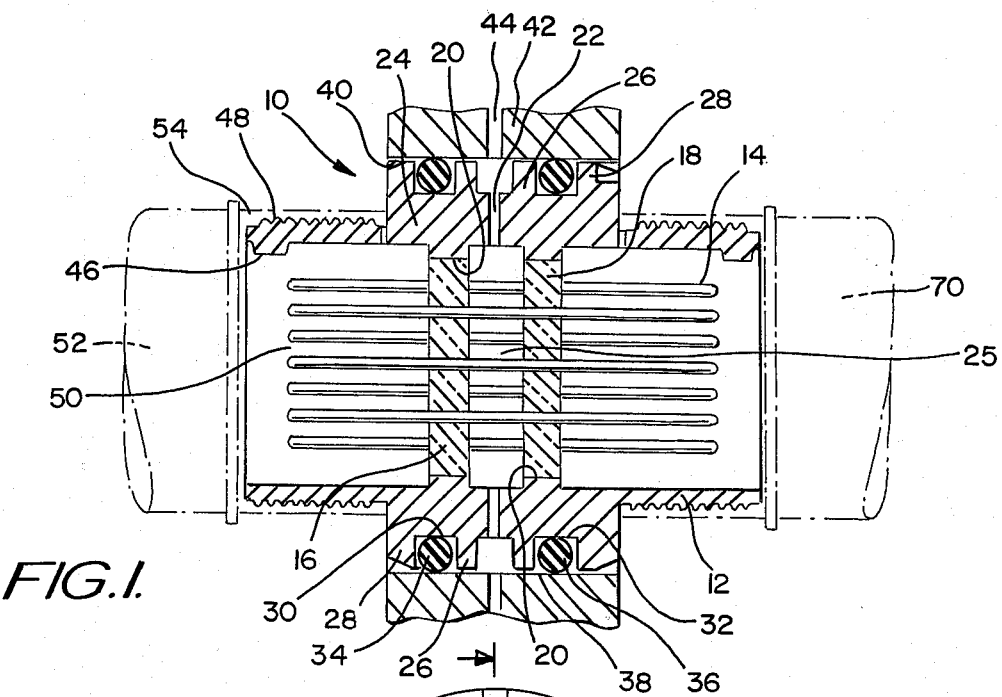
FIG.1.
FIG.2.
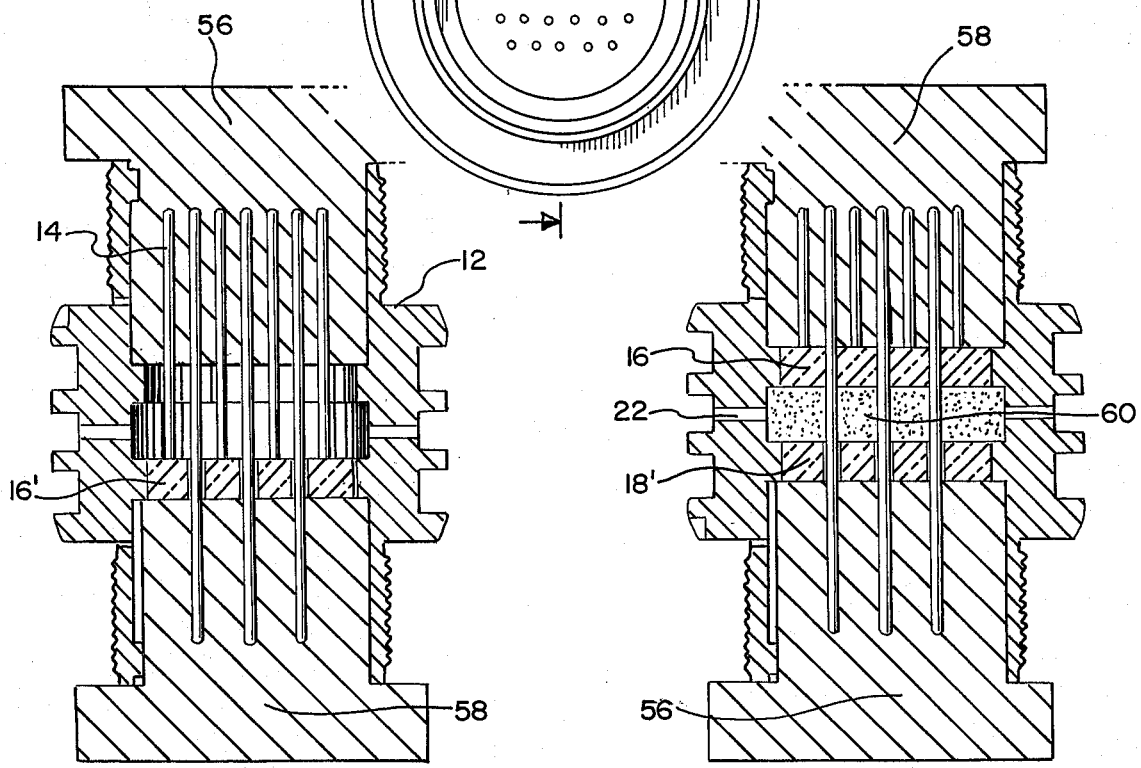
FIG.3.          FIG.4.

INTERCONNECTOR

BACKGROUND OF THE INVENTION

1. Field of the Invention

This invention relates to an interconnector for installation in an opening in a partition or wall to provide at least one electrical connection through the partition or wall. The invention also relates to a method of making such an interconnector. The invention is primarily concerned with an interconnector for use in a nuclear plant, though the interconnector is suited for use in other structures.

2. Description of the Prior Art

The reactor core of a nuclear plant is housed in a pressure-tight containment and many electrical connections have to pass through the wall of the containment so that the core can be monitored and controlled. Usually interconnectors are sealed in openings in a partition plate which is then installed in an opening in the primary containment wall. Each interconnector, which is often referred to as a feedthrough module, includes a plurality of spaced electrical conductors which are insulated from one another and which extend through the interconnector. In some interconnectors the conductors are spaced and insulated by means of epoxy resin seals but in certain applications glass sealing members are required.

The conductors serve to interconnect respective electrical circuits either side of the partition plate (otherwise known as a header plate) and this is effected by mating connectors at the ends of cables on either side of the partition plate with the connectors formed by the respective ends of the feedthrough module.

A header plate with sealed feedthrough modules is termed an electric penetration assembly. Such an assembly has to fulfil two main functions; firstly to maintain the pressure-tight integrity of the primary containment, and secondly to ensure that there is no break in the electrical circuity.

Since cost of maintenance is high in a nuclear plant, and since safety is a crucial factor, it is desirable to be able to verify that an effective seal obtains at each feedthrough module while the plant is in operation. To this end designs for electric penetration assemblies have been adopted which provide for detecting any failure in the seals. In such designs, two seals are provided in series for each interconnector with a space therebetween. This can be achieved either by placing two header plates in series in an opening in the containment wall with each interconnector passing through corresponding openings in the two header plates and sealed against them, or using a single header plate and sealing the interconnector at two spaced locations against the opening through the header plate. In either case, the pressure in the space between the seals is established at a value intermediate that of the interior (high pressure) and the exterior (atmospheric pressure) and then monitored. A drop in pressure indicates a leak to the exterior, while a rise in pressure indicates a leak from the interior.

SUMMARY OF THE INVENTION

It is an object of the invention to provide a simplified design of interconnector which has glass sealing members, is of unitary construction and permits monitoring of the seals formed by the sealing members.

According to one aspect of the present invention there is provided an interconnector for installation in an opening in a partition or wall to provide at least one electrical connection through the partition or wall, the interconnector comprising a one-piece tubular metal shell and at least one conductor supported within the shell and extending in the direction of the axis of the shell, the conductor or conductors being supported by two glass sealing members which are spaced apart along the said axis and are sealed against the inner surface of the shell and against the conductor or conductors, there being at least one port extending through the wall of the shell to provide access to the space between the two glass sealing members.

When the interconnector is used in a nuclear plant it can be installed in an opening of one or more header plates and fitted into the primary containment wall. The port or ports are then coupled to external pressure-testing means, whereby the space between the sealing members can be established at an intermediate pressure and monitored. The ends of the interconnector may be formed as connectors for receiving connectors fitted to cables. It is preferred to provide means for securing the cable connectors in position, for example by the provision of a screw thread on the outer surface of the end of the interconnector for co-operation with a thread on the inner surface of a captive collar on the cable connector. With the cables attached to the opposite ends of the interconnector, each conductor within the interconnector contacts a contact of each cable connector, providing an electrical connection between corresponding contacts.

It is a further object of the invention to provide a method for making the interconnector defined above.

According to another aspect of the present invention there is provided a method for making an interconnector in which two spaced-apart glass sealing members are sealed within a one-piece tubular metal shell, the sealing members being sealed by fusion against the inner surface of the shell and against at least one conductor within the shell which extends in the direction of the axis of the shell, the sealing operation including supporting one of the sealing member during fusion by a layer of inert flowable material disposed between the two sealing members, and subsequently removing the inert flowable material through at least one port extending through the wall of the shell.

While it is possible to seal the two sealing members in position simultaneously, in the preferred method they are sealed in two separate stages. A first glass sealing member such as a preform is fused in position, for example by supporting the shell and conductor or conductors together with the preform in jigs in the positions in which they are to be sealed, and fusing the preform. The layer of inert flowable material is then applied over one face of the sealing member, after which the second sealing member is fused in position. The second sealing member may be sealed by inserting a second glass preform into the shell over the layer of inert material, holding the resultant assembly in jigs, and fusing the second glass preform. In the preferred two-stage fusing operation identical preforms and the same jigs may be used for both stages.

The inert material has to be chemically inert in the conditions that obtain during the sealing of the sealing members. The preferred inert material is high purity carbon powder, though other materials such as ceramic powders, e.g. aluminium oxide powder, could be used. It is particularly important that the layer should be inert towards the glass and should not adhere thereto. Where a powder is employed then the layer should preferably be compact such that particles will not detach and fuse into the glass. A simple test in this respect for assessing whether a powder is sufficiently compact is to apply the layer and then invert it. If it is sufficiently compact then the powder will cohere together and be self-supporting.

The operation of removing the inert flowable material through a port or ports subsequent to the fusing of the two seals can be carried out by, for example, shaking the interconnector, employing a vacuum line, or ultrasonic agitation. Depending on the particular technique used for removing the inert flowable material, it may be appropriate to provide more than a single port. For example, a vacuum line may be applied to one port while an air line is applied to another port. It is desirable to provide several ports where several conductors are supported within the shell in order to make it easier to ensure that all the inert flowable material has been removed. In some cases it may be necessary to clear the ports of flashing before the inert material can be removed.

BRIEF DESCRIPTION OF THE DRAWINGS

The invention will now be described in greater detail with reference to the accompanying drawings representing preferred embodiments of an interconnector according to the present invention. In the drawings:

FIG. 1 shows in cross-section an interconnector fitted into a partition of a nuclear plant, the cross-section being taken along the axis of the shell of the interconnector;

FIG. 2 is an end elevation of the interconnector shown in FIG. 1;

FIG. 3 illustrates a stage in the formation of the interconnector of the previous Figure; and FIG. 4 illustrates a stage in the formation of the interconnector of FIGS. 1 and 2 subsequent to the stage illustrated in FIG. 3.

DESCRIPTION OF THE PREFERRED EMBODIMENTS

Referring first to FIGS. 1 and 2, the interconnector 10 comprises a one-piece tubular metal shell 12. A plurality conductors 14 extend parallel to the axis of the shell and are supported within the shell 12 by two glass seals 16 and 18 spaced apart along with axis of the shell and sealed against the inner surface 20 of the shell 12 and against the conductors 14. Four ports 22 extend through the wall 24 of the shell 12 to provide access to the space 25 between the two glass sealing members 16 and 18. In this instance four ports have been provided so as to facilitate access to the space 25 whereby it is easier to ensure no foreign material remains lodged within the space after sealing of the sealing members.

On either side of the ports 22, the wall 24 of the shell 12 has a pair of circumferential ridges 26 and 28 which define seatings 30 and 32 for 'O' rings 34 and 36. The 'O' rings 34 and 36 each seal the interconnector against the surface 38 of an opening 40 in a partition 42, which in this instance is a header plate installed in the wall of a primary containment of a nuclear plant. These 'O' rings are similar to those used in conventional header plates and as such-can form part of a series of seals. The provision of secondary or so-called redundant seals increases the reliability of the overall seal provided and is desirable in nuclear plants. A bore 44 in the partition 42 couples the ports 22 with an external pressure-testing means (not shown) whereby the space 26 between the two glass sealing members 16 and 18 can be established at a pressure intermediate the pressures on either side of the partition 42 and whereby any deviations from the intermediate pressure can be detected.

As shown in FIGS. 1 and 2 of the drawing, each end of the shell 12 is provided with a notch 46 on its inner surface and with a screw thread 48 on its outer surface. In use, a plug connector 50 at the end of a cable 52 outside the containment structure is plugged into the socket connector formed by the end of the shell. The plug connector 50 has a groove (not shown) which receives the notch 46 and thus aligns the plug with respect to the axis of the interconnector. Once the plug is in place, a collar 54 which is captive on the plug connector body but is free to be rotated relative to the body and has an internal thread, is screwed onto the end of the interconnector, as shown, to secure the cable in position. Sockets (not shown) within the plug 50 then contact respective conductors 14. A plug connector 70 at the end of a cable inside the containment structure is connected to the socket formed by the other end of the shell in the same manner so that the conductors 14 effect electrical connections through the partition 42 between the cables.

As will be apparent, the interconnector provided by the invention has certain advantages in that it is of unitary construction. This means that it can be assembled in a factory and then installed as a single component in a header plate. In turn, this obviates the need for welding or otherwise assembling the interconnector in situ. As described above, the interconnector 10 can be installed using accepted methods utilising 'O' rings. By using a shell of one-piece construction and thus avoiding joints in the shell, the reliability of the interconnector is improved.

Referring now to FIG. 3, a preferred method for making the interconnector 10 involves sealing a first glass sealing member 16 by supporting the shell 12 and conductors 14 together with a glass preform 16' in jigs 56 and 58 in the positions in which they are to be sealed, and fusing the preform 16' to seal the sealing member 16. In this particular instance the glass employed is a soda lime barium glass such as that designated Corning 1010, but other glasses can be used. As will be apparent, the fusing conditions are adapted to the particular glass and are selected to ensure the glass flows to seal any gaps between the seal and the inner surface of the shell and between the seal and the contacts. By way of illustration, the conditions chosen for the production of an interconnector having 50:50 Ni:Fe conductors were such that the soda lime barium glass experiences an oven temperature between 850° and 950° C for 40 minutes.

After this operation the upper jig 56 is removed and a compact layer 60 of high-purity carbon powder applied over the upper face of the sealing member 16. A second glass preform 18', identical to the preform 16', is inserted and the jib 56 replaced. The resultant assembly is then inverted (as shown in FIG. 4) and the second preform fused. The conditions used were the same as for sealing of the first sealing member. The layer of carbon powder supports the glass sealing member 16 which also fuses when the preform 18' is fused. Since the fused sealing member 16 is supported on its lower face by the compact layer 60 and is covered on its upper face by the jig 58 wetting problems are avoided. The jigs 56 and 58 are then removed after the sealing and the carbon powder layer 60 removed through the ports 22.

The provision of four ports makes it a simple matter to ensure complete removal of the carbon powder layer, particularly since the plurality of conductors 14 might otherwise make this a prolonged operation.

It is often found that one or more of the ports is occluded by flashing, but it is a relatively simple matter to clear the ports, for example by using a pin. Most of the carbon powder can be removed by shaking the interconnector and applying a vacuum line to the ports. A final immersion in an organic solvent bath, e.g. chlorethylene, with ultraconic agitation then removed any remaining powder to give the finished interconnector 10.

From the foregoing, it can be readily realized that this invention can assume various embodiments. Thus, it is to be understood that the invention is not limited to the specific embodiments described herein, but is to be limited only by the appended claims.

The embodiments of the invention in which an exclusive property or privilege is claimed are defined as follows:

1. An interconnector for installation in an opening in a wall to provide at least one electrical connection through said wall, said interconnector comprising:
   a one-piece undivided tubular metal shell;
   at least one conductor within said shell and extending parallel to the longitudinal axis of said shell; and
   two glass sealing members spaced apart along said axis and pre-sealed against the inner surface of said shell and around said at least one conductor, the entire space enclosed by said two glass sealing members and the inner surface of said shell consisting of an empty pressure chamber through which only said at least one conductor passes, said glass sealing members supporting said conductor.

2. The inerconnector as claimed in claim 1, wherein said shell includes at least one port extending through the wall of said shell to provide access to said empty pressure chamber.

3. The interconnector as claimed in claim 1, wherein said glass sealing members are sealed to the inner surface of said shell by fusing said sealing members.

4. The interconnector as claimed in claim 1, further comprising means to detachably connect mating connectors to both ends of said interconnector.

5. The interconnector as claimed in claim 1, further comprising means to mount said interconnector in an opening in a wall, such that a double seal is provided between either side of said wall.

6. The interconnector as claimed in claim 5, wherein said means to mount includes two spaced-apart annular channels in the outer surface of said shell, and an 'O'-ring disposed in each of said channels such that said 'O'-rings establish said double seal between said shell and said wall.

7. The interconnector as claimed in claim 5, wherein said double seal is formed by means recessed into said metal shell.

* * * * *